(No Model.)

T. J. FORDE.
GRAPE OR FLOWER CLIPPER OR SHEARS.

No. 594,072. Patented Nov. 23, 1897.

ATTEST
T. B. Moser.
H. E. Madra.

INVENTOR.
Thomas J. Forde.
By H. T. Fisher ATTY.

UNITED STATES PATENT OFFICE.

THOMAS J. FORDE, OF GENEVA, OHIO.

GRAPE OR FLOWER CLIPPER OR SHEARS.

SPECIFICATION forming part of Letters Patent No. 594,072, dated November 23, 1897.

Application filed May 22, 1897. Serial No. 637,696. (No model.)

*To all whom it may concern:*

Be it known that I, THOMAS J. FORDE, a citizen of the United States, residing at Geneva, in the county of Ashtabula and State of Ohio, have invented certain new and useful Improvements in Grape or Flower Clippers or Shears; and I do declare that the following is a full, clear, and exact description of the invention, which will enable others skilled in the art to which it appertains to make and use the same.

My invention relates to fruit and flower clippers or shears; and the improvement consists in the construction as shown and described, and more particularly pointed out in the claim.

Figure 1:
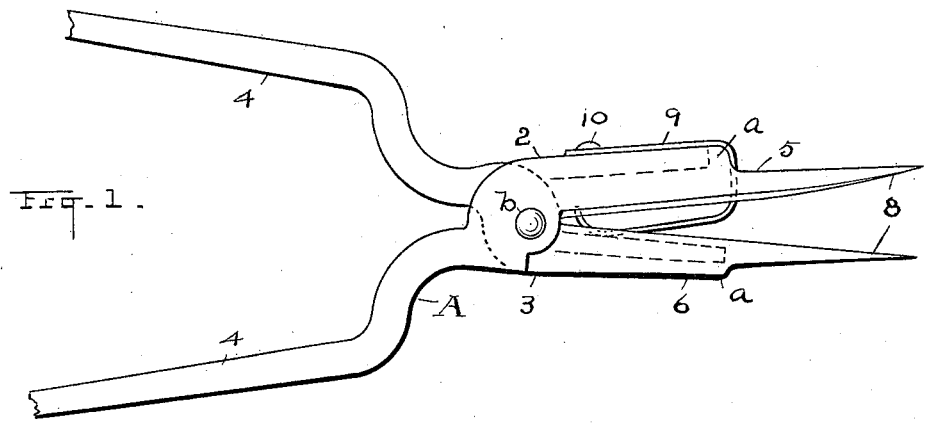
Figure 2:
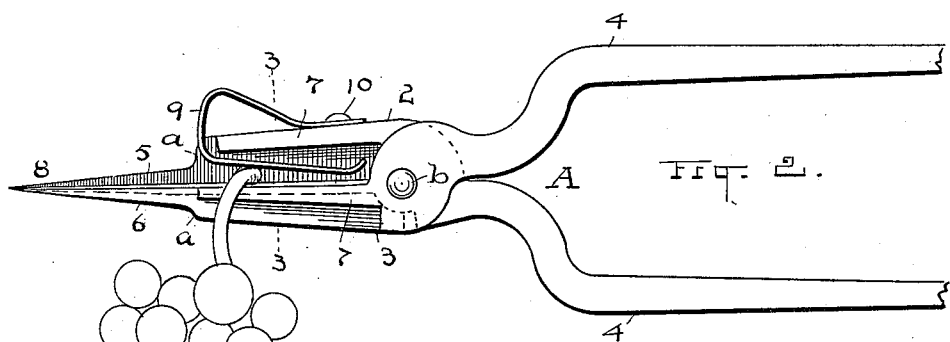
Figure 3:
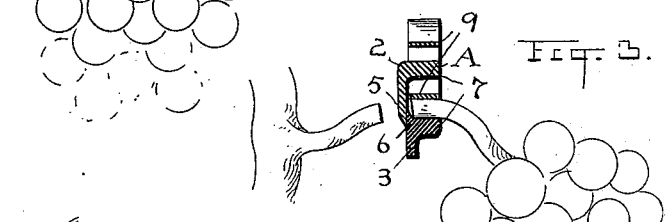
Figure 4:
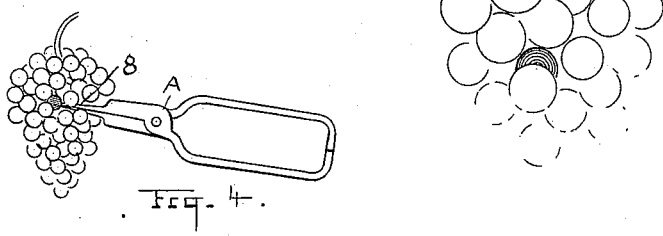

Figure 1 is a side elevation of a pair of my improved clippers. Fig. 2 is a similar view showing a bunch of grapes suspended and held by the spring after the same has been cut from the stock. Fig. 3 is a cross-section on line 3 3 of Fig. 2. Fig. 4 is a reduced view showing the utility of slender-pointed shears in removing a dead grape from a bunch.

In the accompanying drawings, A represents a pair of clippers constructed of two blades 2 and 3, pivoted and fastened together at *b* and having suitable handles 4 of any preferred pattern to operate the said blades. These blades are constructed with a double purpose, which is to make the clipper applicable for cutting light stock, such as flower-stems and the like, and also heavy stock, such as grape-vines and the like. To obtain these results, I make the half of the blades 2 and 3 nearest their pivot *b* heavier than the front halves 5 and 6 and with substantially parallel reinforcing-ribs 7 at one side and with shouldered offsets *a* at the outer extremities of said ribs. The points 5 and 6 are made light, long, and very slender, because in cutting flowers longer and more slender-pointed shears are preferred to allow a longer reach into the body of the bush or plant and do the work without breaking or injuring the surrounding stems or branches. The picking out of bad or decayed grapes from a bunch is easily accomplished with this construction, as clearly shown in Fig. 4.

In connection with the shears as described means are provided to hold and retain the stem of a flower or of a bunch of grapes or the like after it has been severed by the clippers, and these means comprise a spring 9, U-shaped in side elevation and fastened at 10 on the outside of the rib 7 on the heavy half of the blade 2 and operating in conjunction with rib 7 on blade 3. This spring passes from its fastening-point 10 on the top of upper rib 7 to the front of said rib and then down and back between the two ribs 7 and 7, and the free ends rest on the top of the rib 7, which is on blade 6, at a point substantially opposite the cutting edges of the blades. The spring is flat in cross-section and of sufficient width to grip and hold any stem of any size that the clippers will cut. By having the spring fastened at point 10, as shown, there is no danger of exerting such pressure by spring 9 as will injure a stem.

What I claim is—

As a new article of manufacture, a clipper for fruits, flowers and the like, consisting of a pair of pivotally-connected shear-blades, one of said blades having a lateral rib substantially parallel to the cutting edge thereof and a spring fixed to the other blade and arranged to bear on said rib substantially the full length thereof, and said blades having sharp-pointed cutting extremities projecting beyond said rib and spring, substantially as described.

Witness my hand to the foregoing specification this 11th day of May, 1897.

THOMAS J. FORDE.

Witnesses:
GEO. B. GOULD,
I. W. MCCONNELL.